United States Patent
Varga et al.

(10) Patent No.: US 8,243,313 B2
(45) Date of Patent: Aug. 14, 2012

(54) CACHE OPTIMIZATION MECHANISM

(75) Inventors: John Varga, Longmont, CO (US);
Dennis Carney, Louisville, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 643 days.

(21) Appl. No.: 12/471,764

(22) Filed: May 26, 2009

(65) Prior Publication Data
US 2010/0302576 A1 Dec. 2, 2010

(51) Int. Cl.
*G06F 12/00* (2006.01)
*G06F 13/00* (2006.01)
*G06F 13/28* (2006.01)

(52) U.S. Cl. ....... 358/1.15; 711/120; 711/130; 711/138; 711/118; 358/1.18

(58) Field of Classification Search ................. 358/1.15, 358/1.18; 711/118, 120, 130, 138
See application file for complete search history.

(56) References Cited

U.S. PATENT DOCUMENTS

| | | | | |
|---|---|---|---|---|
| RE35,922 E | * | 10/1998 | Cuzzo et al. | 395/113 |
| 5,870,535 A | | 2/1999 | Duffin et al. | |
| 6,014,224 A | * | 1/2000 | Mitani | 358/1.16 |
| 6,476,931 B1 | * | 11/2002 | Aizikowitz et al. | 358/1.18 |
| 7,385,729 B2 | | 6/2008 | Clark et al. | |
| 2003/0098987 A1 | | 5/2003 | Fiske | |
| 2003/0107766 A1 | * | 6/2003 | Ramot et al. | 358/1.18 |
| 2004/0246502 A1 | | 12/2004 | Jacobsen et al. | |
| 2005/0010727 A1 | * | 1/2005 | Cuomo et al. | 711/138 |
| 2005/0162676 A1 | | 7/2005 | Aoki | |
| 2008/0198399 A1 | | 8/2008 | Jacques | |

FOREIGN PATENT DOCUMENTS

| | | |
|---|---|---|
| EP | 0764918 A2 | 3/1997 |
| EP | 0780761 A2 | 6/1997 |
| EP | 1011068 A2 | 6/2000 |
| JP | 2000003257 A | 1/2000 |
| JP | 2006140597 | 6/2006 |
| JP | 2006313424 A | 11/2006 |

OTHER PUBLICATIONS http://en.wikipedia.org/wiki/Cache_(computing), Cache (computing), Apr. 9, 2012, Wikipedia.*

* cited by examiner

*Primary Examiner* — Charlotte M Baker
*Assistant Examiner* — Aaron R Gerger
(74) *Attorney, Agent, or Firm* — Blakely, Sokoloff, Taylor & Zafman LLP

(57) ABSTRACT

A method is disclosed. The method includes identifying a received object to be cached, calculating a time to rasterize the object, determining if the rasterize time is greater than a time to reuse a rasterized image of the object, caching the object if the reuse time is greater than the rasterize time and caching the rasterized image of the object if the rasterize time is greater than the reuse time.

16 Claims, 4 Drawing Sheets

CACHE OPTIMIZATION MECHANISM

FIELD OF THE INVENTION

This invention relates generally to the field of printing systems. More particularly, the invention relates to image processing in printing systems.

BACKGROUND

Print systems include presentation architectures that are provided for representing documents in a data format that is independent of the methods that are utilized to capture or create those documents. One example of an exemplary presentation system, which will be described herein, is the (Advanced Function Presentation) AFP™ system developed by International Business Machines Corporation. According to the AFP system, documents may include combinations of text, image, graphics, and/or bar code objects in device and resolution independent formats. Documents may also include and/or reference fonts, overlays, and other resource objects, which are required at presentation time to present the data properly.

Once the documents are received at a printer, processing is performed to convert a document into a printable format. However, processing high-resolution images in an incoming data stream into a printable format typically involves highly compute-intensive operations (e.g., scaling, rotation, decompression, color conversion, etc.).

Further, it is common for a printer to frequently process repetitive images throughout a print job. For instance, a print job may include a full-page background image or a company logo that appears on every printed page. Therefore, print systems typically include caching mechanisms to store and reuse processed images.

However in print systems having several nodes, where processing is remotely performed in parallel, local caching is often complicated. For instance, when an image is rasterized by one of the nodes, it is often desirable to cache the rasterized version (e.g., bitmap) of the image to prevent having to rasterize the same image when it is subsequently used. Thus, a control mechanism at the print system typically caches rasterized images to improve performance.

Caching rasterized images improves performance, however, only when the task time (e.g., time to rasterize an image) takes longer than the time to reuse a rasterized image (e.g., fetching the previously rasterized image from the cache and reusing it). Conventional printing systems save a rasterized object every time and enable a system user to manually turn caching off if a print job runs slow. Such a mechanism requiring manual operation is inefficient. Accordingly, a mechanism to optimize caching is desired.

SUMMARY

In one embodiment, a method is disclosed. The method includes identifying a received object to be cached, calculating a time to rasterize the object, determining if the rasterize time is greater than a time to reuse a rasterized image of the object, caching the object if the reuse time is greater than the rasterize time and caching the rasterized image of the object if the rasterize time is greater than the reuse time.

In another embodiment, a printer is disclosed. The printer includes a control unit having a disk database, a head node to identify whether a received print object is to be cached and a compute node. The compute node calculates a time to rasterize the object, determines if the rasterize time is greater than a time to reuse a rasterized image of the object, caches the object if the reuse time is greater than the rasterize time and caches the rasterized image of the object if the rasterize time is greater than the reuse time.

BRIEF DESCRIPTION OF THE DRAWINGS

A better understanding of the present invention can be obtained from the following detailed description in conjunction with the following drawings, in which.

DETAILED DESCRIPTION

A mechanism to efficiently cache objects in a print system is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
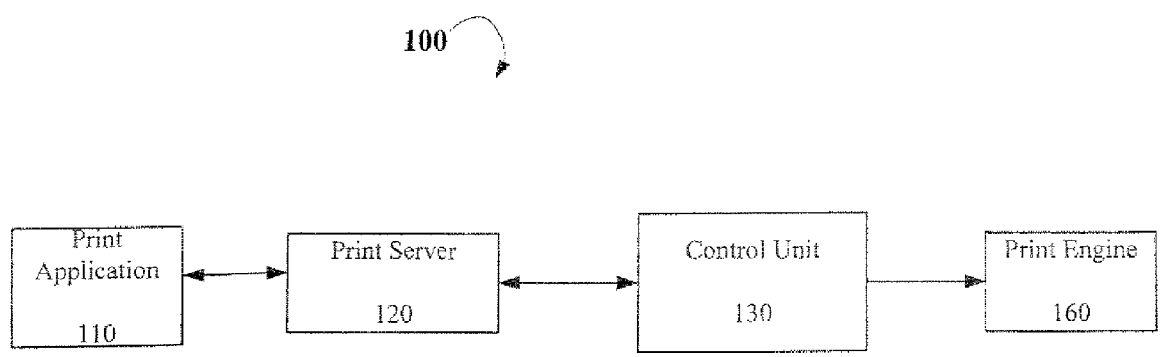
FIG. 1 illustrates one embodiment of a printing system.

FIG. 1 illustrates one embodiment of a printing system 100. Printing system 100 includes a print application 110, a server 120, a control unit 130 and a print engine 160. Print application 110 makes a request for the printing of a document. In one embodiment, print application 110 provides a Mixed Object Document Content Architecture (MO:DCA) data stream to print server 120.

In other embodiments print application 110 may also provide PostScript (P/S) and PDF files for printing. P/S and PDF files are printed by first passing them through a pre-processor (not shown), which creates resource separation and page independence so that the P/S or PDF file can be transformed into an AFP MO:DCA data stream prior to being passed to print server 120.

According to one embodiment, the AFP MO:DCA data streams are object-oriented streams including, among other things, data objects, page objects, and resource objects. In a further embodiment, AFP MO:DCA data streams include a Resource Environment Group (REG) that is specified at the beginning of the AFP document, before the first page.

When the AFP MO:DCA data streams are processed by print server 120, the REG structure is encountered first and causes the server to download any of the identified resources that are not already present in the printer. This occurs before paper is moved for the first page of the job. When the pages that require the complex resources are eventually processed, no additional download time is incurred for these resources.

Print server 120 processes pages of output that mix all of the elements typically found in presentation documents, e.g., text in typographic fonts, electronic forms, graphics, image, lines, boxes, and bar codes. The AFP MO:DCA data stream is composed of architected, structured fields that describe each of these elements.

In one embodiment, print server 120 communicates with control unit 130 via an Intelligent Printer Data Stream (IPDS). The IPDS data stream is similar to the AFP data stream, but is built specific to the destination printer in order to integrate with each printer's specific capabilities and command set, and to facilitate the interactive dialog between the print server 120 and the printer. The IPDS data stream may be built dynamically at presentation time, e.g., on-the-fly in real time. Thus, the IPDS data stream is provided according to a device-dependent bi-directional command/data stream.

Figure 2:
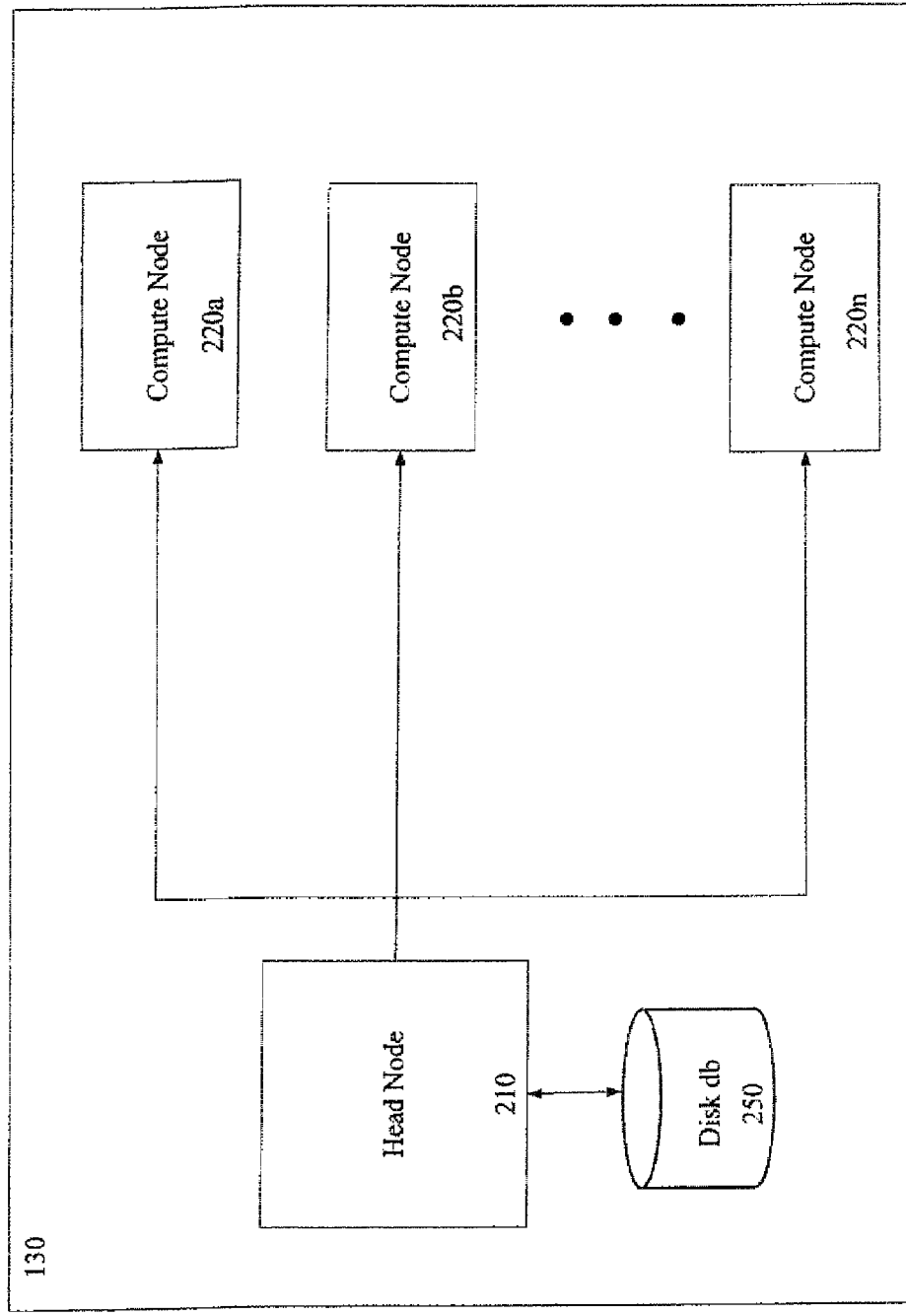
FIG. 2 illustrates one embodiment of a control unit.

According to one embodiment, control unit 130 processes and renders objects received from print server 120 and provides sheet maps for printing to print engine 160. FIG. 2 illustrates one embodiment of a control unit 130. Control unit 130 includes a head node 210 and a multitude (e.g., fourteen) of compute node machines (compute nodes) 220*a*-220*n*.

Head node 210 receives print job data as IPDS data streams and separates the data into sheet sides that are forwarded to compute nodes 220*a*-220*n* for processing. According to one embodiment, head node 210 is coupled to a disk database 250. Disk database 250 is implemented to store previously processed image objects that are retrieved and used at compute nodes 220.

Figure 3:
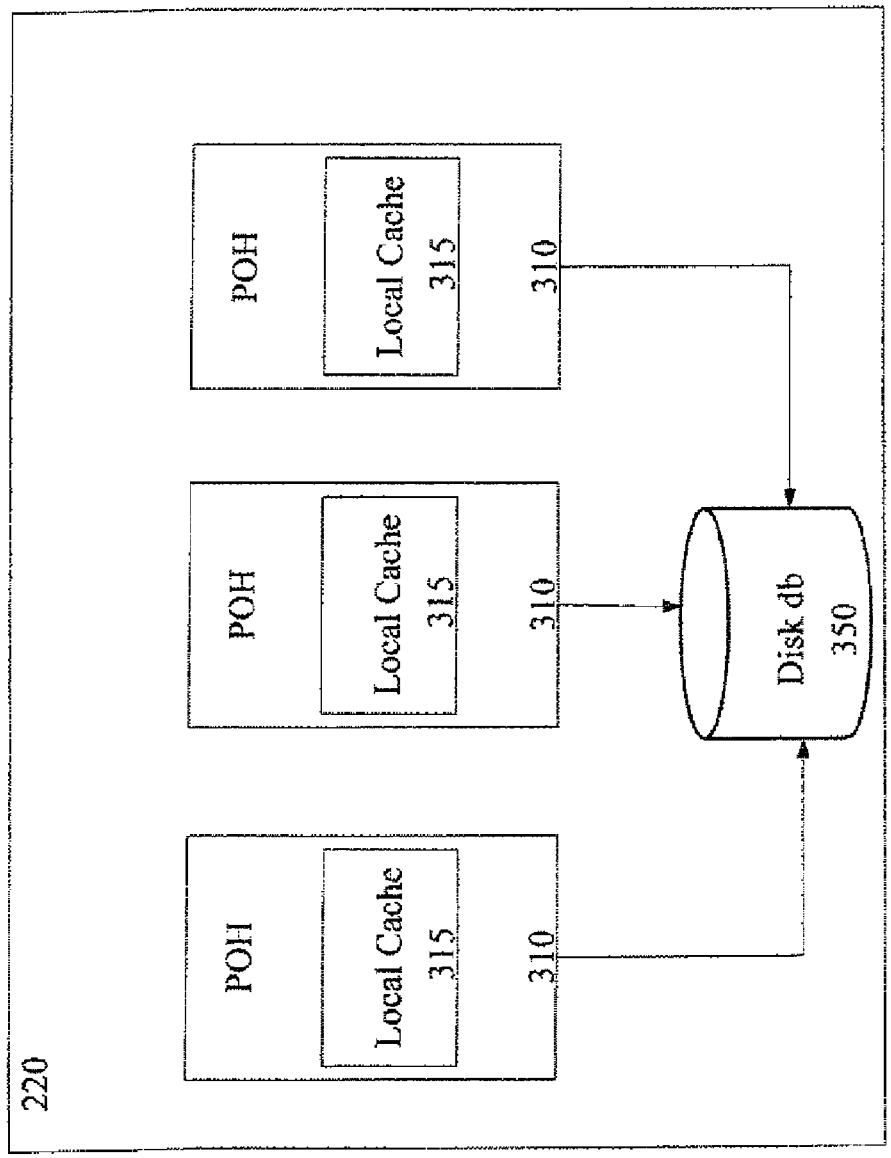
FIG. 3 illustrates one embodiment of a compute node.

Compute nodes 220 rasterize the sheet sides received from head note 210. Compute nodes 220 save data to disk database 250 upon being instructed by head node 210 to cache the data. In one embodiment, each node 220 includes two or more parallel page output handlers (POHs). FIG. 3 illustrates one embodiment of a compute node 220. Compute node 220 includes POHs 310 implemented to process image objects.

In one embodiment, each POH 310 includes a separate transform engine (not shown) that processes received objects by performing a raster image process (RIP) to produce a bitmap. However, in other embodiments, the transforms may process any type of data object received at control unit 130. Compute node 220 also includes a disk database 350 to store the object data.

Disk database 350 is central to each of the POH 310 at node 220, and thus stores data for objects processed by all of the POH 310. However, in a further embodiment, each POH 310 may include an associated memory database (or local cache) 315 that caches image objects that a corresponding POH 310 encounters more than once.

According to one embodiment, head node 210 recognizes how each object is received at control unit 130 and makes predictions as to whether the image will be used more than once (e.g., image used multiple times per page). In a further embodiment, a cache optimization process is performed to determine the type of data that is to be cached in order to increase control unit 130 performance.

Figure 4:
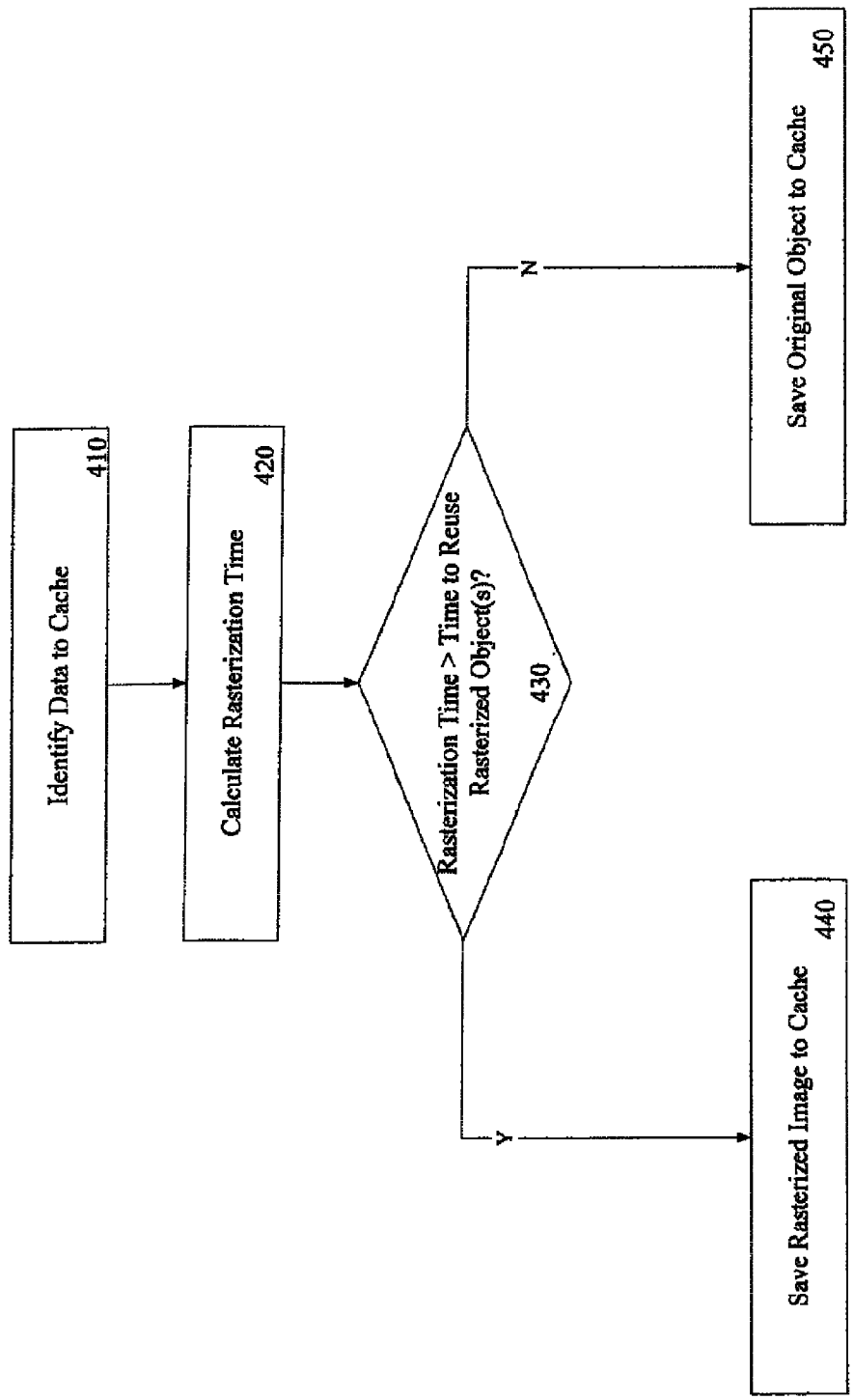
FIG. 4 is a flow diagram illustrating one embodiment of a cache optimization process.

FIG. 4 is a flow diagram illustrating one embodiment of the of the cache optimization process. At processing block 410, head node 210 identifies data that is to be cached. Subsequently a request is forwarded to a compute node 220 to create a cache item. At processing block 420, a POH 310 calculates the time it would take to rasterize the object (e.g., the time to fetch the source data and to write the data into the side map).

In several instances, various types of objects operate faster in certain forms (e.g., bi-level bitmap) than in its rasterized equivalent. Therefore at decision block 430, it is determined whether the rasterize time is greater than the time to reuse a rasterized image (e.g., fetching a rasterized image from a local (315) or shared (250 or 350) cache and merging it into a side map).

If the rasterize time is greater than the time to reuse a rasterized image, the object is cached, processing block 440. However if the reuse time is greater, the original version of the object is saved in the cache instead of the rasterized version, processing block 450. As a result, the next time the object(s) is reused from the cache, the object will be in the best format for the fastest type of processing.

According to one embodiment, cached objects are saved as display lists, and not as a specific type of object. In such an embodiment, a display list includes a listing of one or more display object types. For instance, a display list may include a bi-level object, a compressed bitmap, image data encoding, rectangle, etc. The display list allows a compute node 220, when creating a cached version, to determine the type of contents and to measure or estimate the rasterization time. Thus, enabling a final display list to be made from both fully rasterized bitmaps or from the original display items.

In a further embodiment, a cached display list may include a mixture of display items where only some of them are fully rasterized. Thus, parts of the original version of an object are retained and the rasterized parts are used where rasterization would take longer. The mixture of display items takes advantage of the fact that some display items can process faster as their original types.

For example, multiple small images on opposite corners of a side-sheet can be individually rasterized and saved in the display list as two small items instead of creating a bitmap of the entire side with the two images at opposite ends. Even if the intervening white space compresses quickly, this may still significantly add to the size of the resultant compressed bitmap when compared to two smaller bitmaps and some control information to determine positioning. In a further embodiment, new objects may be created that make use of highly compressible types of new display items in the cached display list.

According to one embodiment, a side list is created when processing the display list to be cached. The side list includes the objects in the display list, as well as their type, and coverage. Thus, the side list allows compute node 220 to track which areas are "clean" (e.g., not overlapped) and "mixed" (e.g., multiple objects mixed in, or image-type objects and PDF/EPS objects). As a result, clean objects described as bi-level or rectangle or solid areas can be saved as those types of items rather than mixed into a generic bitmap, allowing a better optimization when reusing the objects.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method comprising:
   identifying a received object to be cached;
   calculating a time to rasterize the object;
   determining if the rasterize time is greater than a time to reuse a rasterized image previously generated for the object;
   caching the object if the reuse time is greater than the rasterize time; and
   caching the rasterized image of the object if the rasterize time is greater than the reuse time,
   wherein the rasterized image and the object are cached as a display list.

2. The method of claim 1 wherein reusing the rasterized image comprises:
   retrieving the display list for processing; and
   merging the rasterized image into a side sheet if the display list includes the rasterized image.

3. The method of claim 1 further comprising:
   retrieving the display list for processing;
   rasterizing the object to form a rasterized image of the object, if the display list includes the object; and
   merging the rasterized image into a side sheet.

4. The method of claim 1 wherein caching the object comprises:
   caching a first component of the object as received; and
   caching a second component of the object as a rasterized image of a second object.

5. The method of claim 4 further comprising:
   retrieving the display list for processing;
   rasterizing the first component; and
   merging the rasterized images of the first component and the second component into a side sheet.

6. A printing system comprising:
   a printer server; and
   a printer comprising:
   a print head; and
   a control unit having:
   a disk database to store cached objects;
   a head node to identify whether a received print object is to be cached; and
   a compute node to calculate a time to rasterize the object, determine if the rasterize time is greater than a time to reuse a rasterized image previously generated for the object, cache the object if the reuse time is greater than the rasterize time and cache the rasterized image of the object if the rasterize time is greater than the reuse time;
   wherein the rasterized image and the object are cached as a display list.

7. The printing system of claim 6 wherein the compute node retrieves the display list and merges the rasterized image into a side sheet if the display list includes the rasterized image.

8. The printing system of claim 6 wherein the compute node retrieves the display list, rasterizes the object to form a rasterized image of the object if the display list includes the object and merges the rasterized image into a side sheet.

9. The printing system of claim 6 wherein the compute node caches a first component of the object as received and caches a second component of the object as a rasterized image of a second object.

10. The printing system of claim 9 wherein the compute node retrieves the display list, rasterizes the first component and merges the rasterized images of the first component and the second component into a side sheet.

11. A non-transitory machine-readable medium including data that, when accessed by a machine, cause the machine to perform operations comprising:
    identifying a received object to be cached;
    calculating a time to rasterize the object;
    determining if the rasterize time is greater than a time to reuse a rasterized image previously generated for the object;
    caching the object if the reuse time is greater than the rasterize time; and
    caching the rasterized image of the object if the rasterize time is greater than the reuse time,
    wherein the rasterized image and the object are cached as a display list.

12. The machine-readable medium of claim 11 wherein caching the object comprises:
    caching a first component of the object as received; and
    caching a second component of the object as a rasterized image of a second object.

13. The machine-readable medium of claim 12 that, when accessed by a machine, further causes the machine to perform operations comprising:
    retrieving the display list for processing;
    rasterizing the first component; and
    and merging the rasterized images of the first component and the second component into a side sheet.

14. A printer comprising:
    a control unit having:
    a disk database;
    a head node to identify whether a received print object is to be cached; and
    a compute node to calculate a time to rasterizer the object, determine if the rasterize time is greater than a time to reuse a rasterized image previously generated for the object, cache the object if the reuse time is greater than the rasterize time and cache the rasterized image of the object if the rasterize time is greater than the reuse time,
    wherein the rasterized image and the object are cached as a display list.

15. The printer of claim 14 wherein the compute node retrieves the display list and merges the rasterized image into a side sheet if the display list includes the rasterized image.

16. The printer of claim 14 wherein the compute node retrieves the display list, rasterizes the object to form a rasterized image of the object if the display list includes the object and merges the rasterized image into a side sheet.

* * * * *